United States Patent
Caspar et al.

(10) Patent No.: US 7,598,008 B2
(45) Date of Patent: Oct. 6, 2009

(54) METHODS FOR IMAGING REGULAR PATTERNS

(75) Inventors: Jonathan V. Caspar, Wilmington, DE (US); Harry Richard Zwicker, Glen Mills, PA (US)

(73) Assignee: Kodak Graphic Communications Canada Company, Burnaby, British Columbia (*) Notice: Subject to any disclaimer, the term of this patent is extended or adjusted under 35 U.S.C. 154(b) by 858 days.

(21) Appl. No.: 11/045,769

(22) Filed: Jan. 28, 2005

(65) Prior Publication Data
US 2005/0175909 A1 Aug. 11, 2005

Related U.S. Application Data

(60) Provisional application No. 60/539,338, filed on Jan. 28, 2004.

(51) Int. Cl.
*G02B 5/20* (2006.01)
(52) U.S. Cl. .......................... 430/7; 430/200; 347/241; 347/248
(58) Field of Classification Search .................. None
See application file for complete search history.

(56) References Cited

U.S. PATENT DOCUMENTS

| | | | |
|---|---|---|---|
| 5,994,028 A | 11/1999 | Lee | |
| 6,146,792 A | 11/2000 | Blanchet-Fincher et al. | |
| 6,242,140 B1 | 6/2001 | Kwon et al. | |
| 6,277,529 B1 | 8/2001 | Marumoto et al. | |
| 6,682,862 B1 | 1/2004 | Chang et al. | |
| 2003/0112321 A1 | 6/2003 | Pierson | |

FOREIGN PATENT DOCUMENTS

| | | |
|---|---|---|
| EP | 0 529 534 A2 | 3/1993 |
| EP | 0 875 386 A1 | 11/1998 |
| EP | 1 219 980 A2 | 7/2002 |

*Primary Examiner*—John A. McPherson
(74) *Attorney, Agent, or Firm*—Nelson A. Blish

(57) ABSTRACT

Methods for imaging regular patterns are provided. A multi-channel imaging head is configured in accordance with the repeat of a pre-determined regular pattern such that no swath boundaries appear within the visibly imaged features of the pattern. The imaged articles have reduced visible banding due to the elimination of swath boundaries in the imaged features.

32 Claims, 6 Drawing Sheets

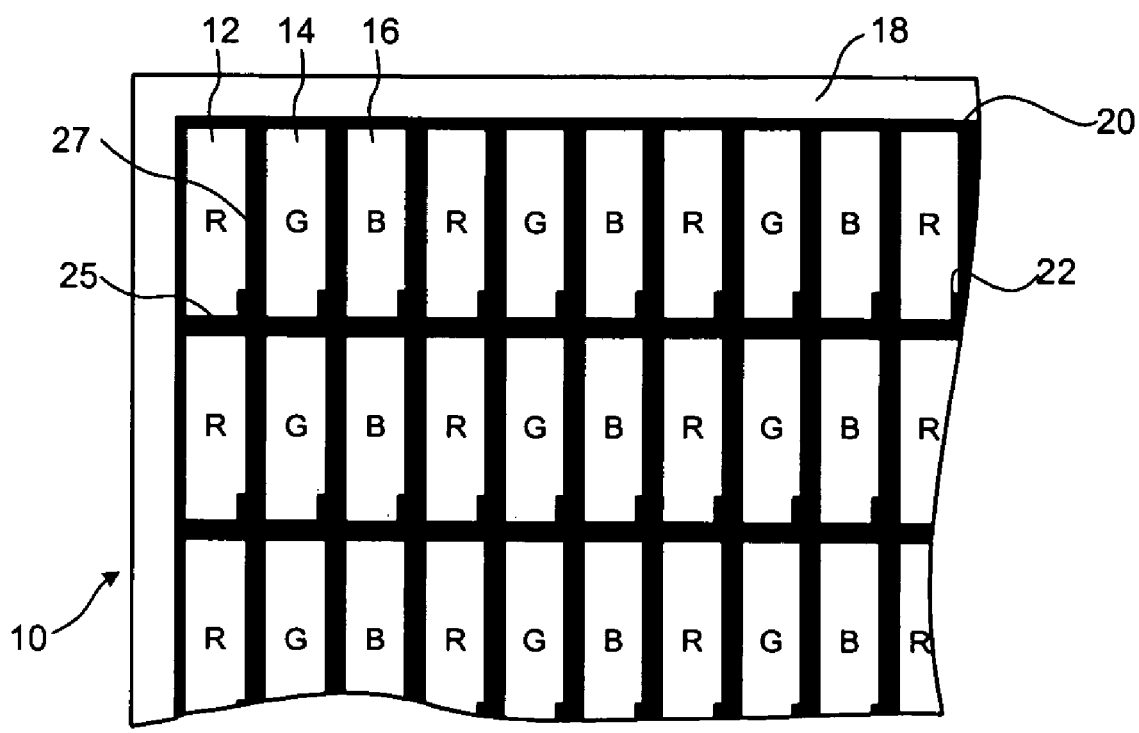
FIG. 1-A
PRIOR ART
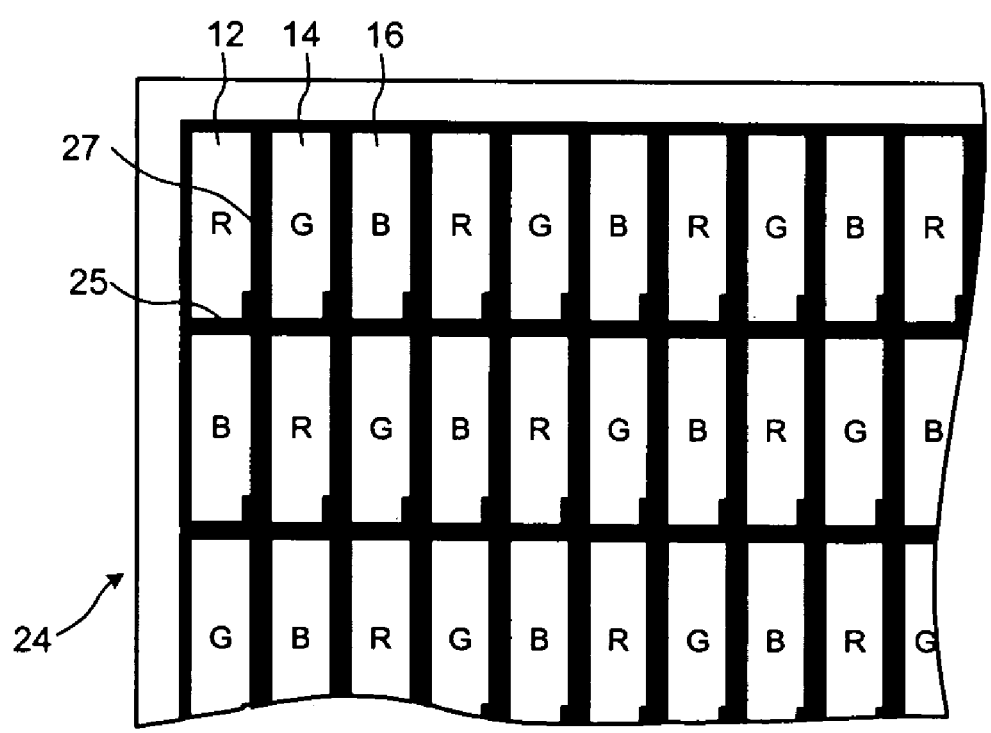
FIG. 1-B
PRIOR ART

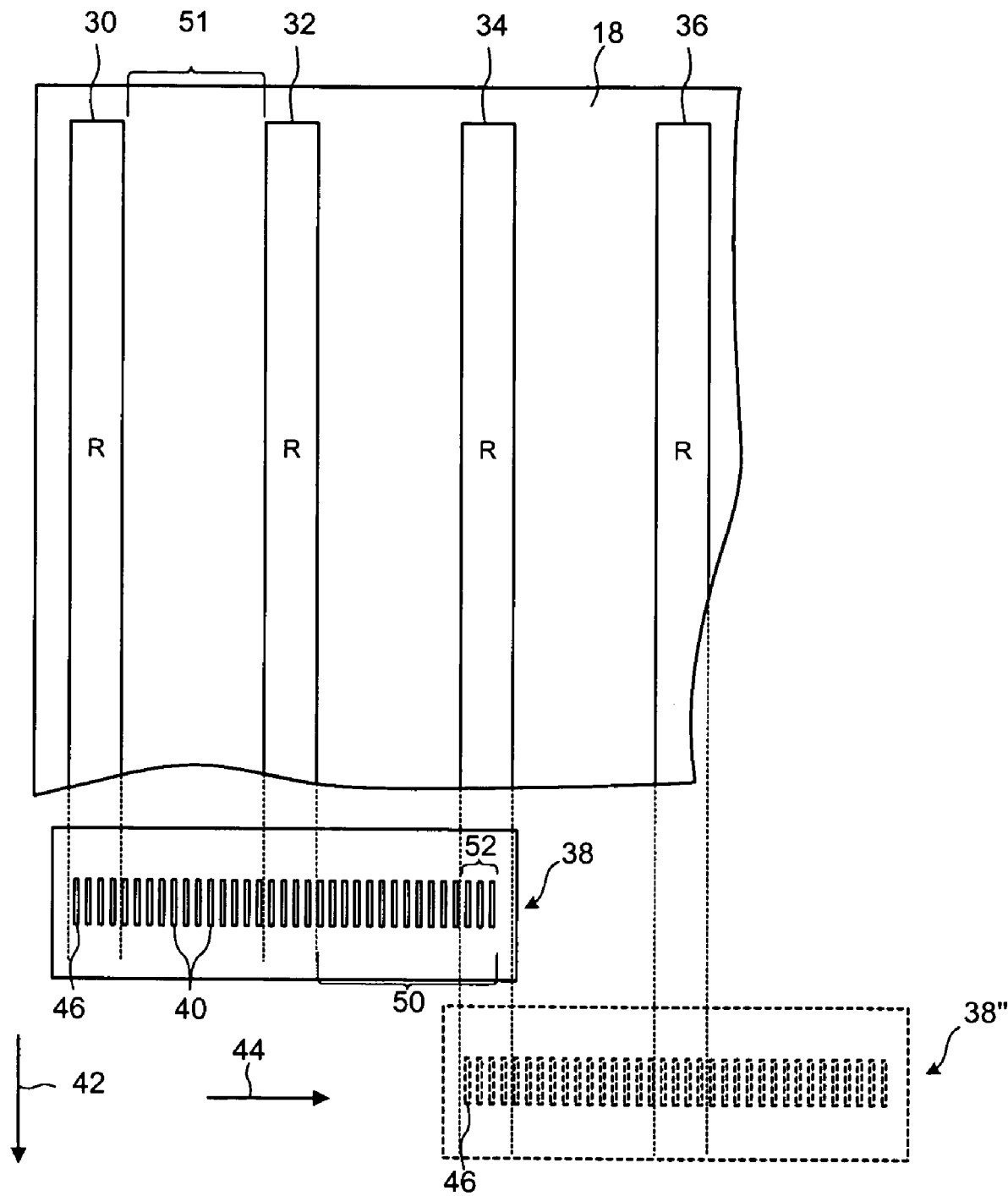
FIG. 4-A

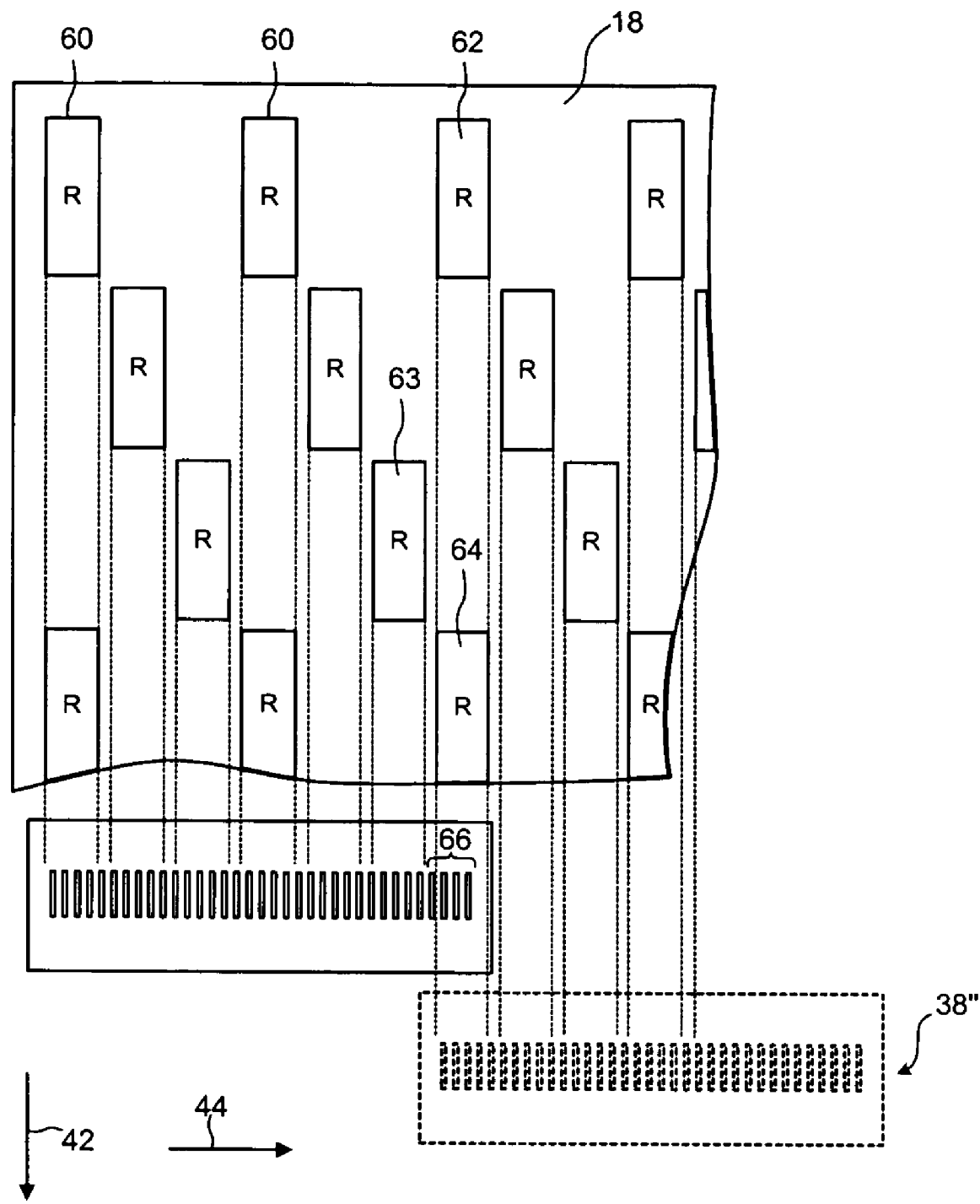
FIG. 4-B

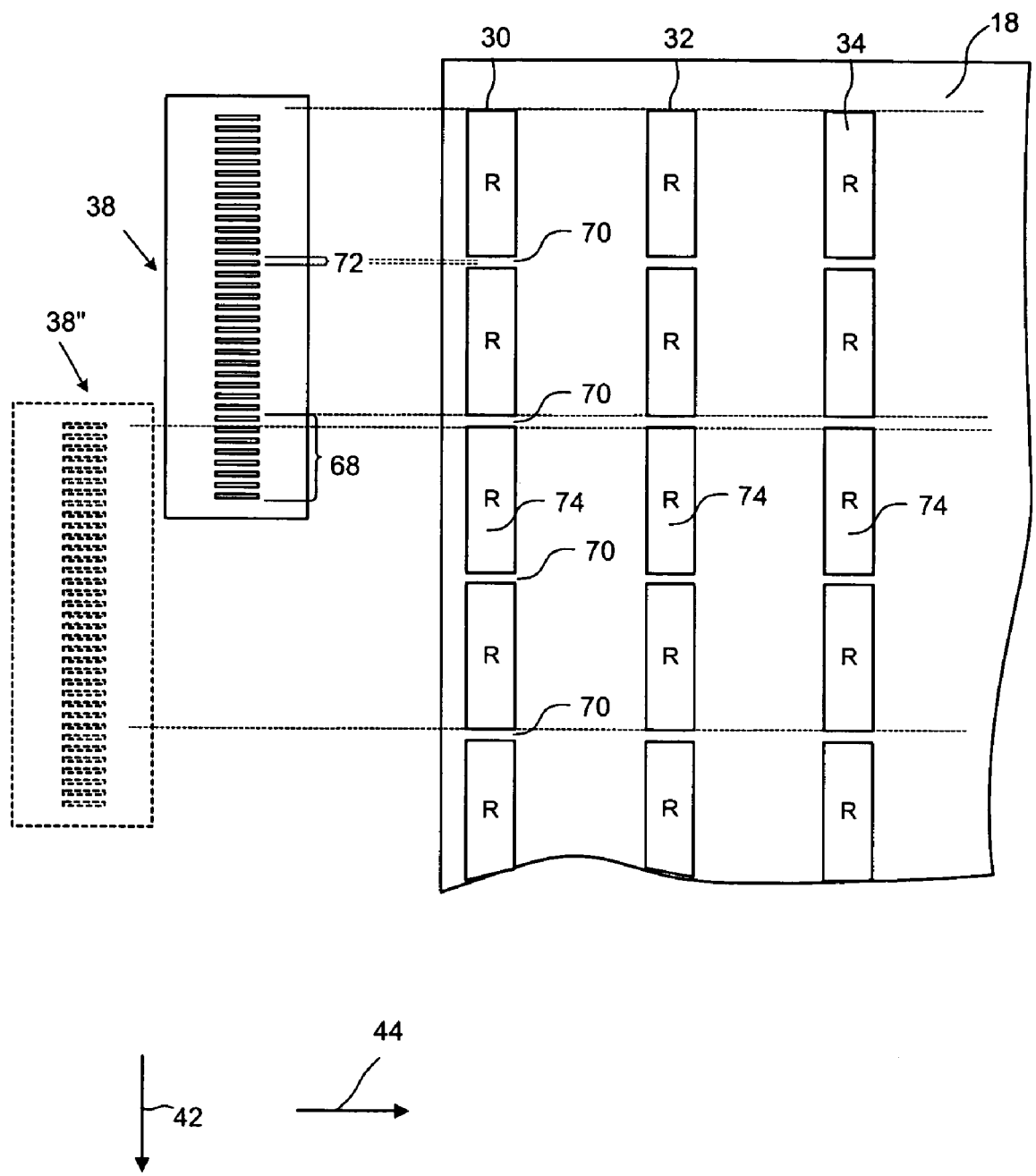
FIG. 4-C

METHODS FOR IMAGING REGULAR PATTERNS

CROSS REFERENCE TO RELATED APPLICATION

This Application claims the benefit under 35 USC 119(e) of U.S. Provisional Patent Application No. 60/539,338, filed Jan. 28, 2004, which is hereby incorporated by reference herein in its entirety. The subject matter of this invention was made under a Cooperative Development Agreement between Creo Products Inc. (now known as Kodak Graphic Communications Canada Company) and E. I. du Pont de Nemours and Company dated Oct. 1, 2001.

FIELD OF THE INVENTION

The present invention relates to imaging systems and more particularly to methods of imaging regular patterns in an imaging system.

BACKGROUND OF THE INVENTION

Commonly employed fabrication techniques for displays and semiconductor electronic devices involve several imaging steps. A color filter substrate coated with a resist or other sensitive material is exposed to radiation through a photo-tool mask to effect some change. By nature these fabrication processes involve a large number of separate steps, each step commonly having a finite risk of failure, thus reducing the overall process yield and increasing the cost of the finished article. A specific example is the fabrication of color filters for flat panel displays also known as a liquid crystal displays. Color filter fabrication can be a very expensive process because of the high cost of materials and low process yield. Traditional photolithographic processing involves applying color resist materials to a substrate using a coating technique such as spin coating, slit and spin or spin-less coating. The material is then exposed via a photo-tool mask followed by a development process.

Direct imaging has been proposed for use in the fabrication of displays and in particular color filters. U.S. Pat. No. 4,965,242 to DeBoer et al., for example, describes a dye transfer process for making a color filter element. A color filter substrate, also known as a dye-receiving element, is overlaid with a dye donor element (also known as a color transcription film) that is then imagewise heated to selectively transfer the dye or pigment from the donor to the receiver. The preferred method of imagewise heating is by means of a laser head preferably comprising a plurality of laser beams. Diode lasers are particularly preferred for their ease of modulation, low cost and small size. It should be noted that the term "dye transfer process" is not, as its name implies, limited to the image-wise transfer of dyes. The dye transfer process can also include the image-wise transfer of dye donors coated with pigments and similar type colorant compositions.

Direct imaging systems typically employ laser heads with hundreds of individually modulated beams in parallel to reduce the time taken to complete the image. Each of the beams is modulated to create a corresponding laser pixel during the imaging process. U.S. Pat. No. 6,146,792 to Blanchet-Fincher et al., for example, describes the production of a durable image on a receiver element, such as a color filter. The laser head suggested in the examples consists of thirty-two 830 nm laser diodes, each with approximately 90 mW of single-mode output. Imaging heads with even more channels, or laser pixels, are now commonly available, exemplified by the SQUAREspot® thermal imaging head manufactured by Creo Inc. of Burnaby, British Columbia, Canada. These imaging heads are available with up to 240 independent imaging channels, each channel having power in excess of 100 mW. The image is written in a series of bands or swaths created by the plurality of laser beams, which are closely abutted to form a continuous image. (It should be noted that the terms "channel" and "laser pixel" are used interchangeably herein.)

One problem with multi-channel imaging systems is that it is extremely difficult to ensure that all channels have identical imaging characteristics. Channel-to-channel variations with respect to power, beam size, beam shape and focus all contribute to the production of a common imaging artifact known as "banding." Banding is often particularly prominent in the area between successively imaged swaths. Each swath is defined by a corresponding image having a beginning end line and an ending end line. Consequently, banding occurs primarily because the terminating end line of the last scanned swath and the beginning end line of the next scanned swath are usually written by channels at opposite distal ends of the swath and are more likely to have differing imaging characteristics. A gradual increase in spot size from channel to channel may not be visible within the swath, but when a swath is abutted with another swath the discontinuity at the swath boundary may become quite pronounced. These pronounced swath boundary discontinuities may lead to objectionable visual artifacts when viewing a color filter that has been produced by a dye transfer method.

Banding is a common problem in multi-channel imaging and may be reduced by careful alignment and calibration of the imaging head. However, thermal and mechanical drifts may result in banding re-appearing after some time. Accordingly, there remains a need for imaging methods that lessen the visibility of banding, particularly at swath boundaries.

SUMMARY OF THE INVENTION

In accordance with the present invention, methods for imaging a regular pattern of features are provided that reduce the visual banding occurring at swath boundaries by configuring the number of channels in the imaging swath to ensure that the boundary does not occur within a visible portion of an imaged feature.

In accordance with the present invention, a method of configuring a multiple channel imaging head for imaging a regular pattern of features may be provided. A repeat distance between the features in the pattern may be determined. A number of channels for imaging may be determined such that only one or more complete pattern features will be imaged in a single scan of the imaging head. The imaging head may be configured in accordance with the determined number of channels. The methods of the present invention may be used, for example, to produce a color filter.

In one example, configuring the imaging head includes disabling at least one of the multiple channels. In another example, at least one of the multiple channels is not imaged, the at least one of the multiple channels being located between the first channel imaged and the last channel imaged in the single scan. In yet another example, the imaging head has sufficient channels for imaging an integer number of complete pattern features and one partial pattern feature in a single scan of the imaging head. In such an example, configuring the imaging head includes disabling at least the channels that image the one partial pattern feature so that only the integer number of complete pattern features are imaged in a single scan of the imaging head.

In still another example, the regular pattern is imaged in a plurality of scans of the imaging head, each successive scan being adjacent to a previous scan. In one example, the multiple channels are spaced apart by a regular fixed distance, and the first channel imaged in the successive scan is displaced from the last channel imaged in the previous scan by more than the fixed distance. In another example, the first channel imaged in the successive scan overlaps at least the last channel not imaged in the previous scan. In yet another example, the last channel imaged in the previous scan overlaps at least the first channel not imaged in the successive scan.

In yet another example, configuring the imaging head includes altering at least one parameter stored in a memory element. The parameter may correspond, for example, to the determined number of channels. In still another example, configuring the imaging head includes reformatting image data representing the pattern of features. In yet another example, the imaging head is used to image at least two different regular patterns, and the configuring is performed for each different regular pattern.

In still another example, the regular pattern includes a pattern of color filter features that may include, for example, a plurality of different colored elongated stripes. The elongated stripes for each color may be imaged separately.

In yet another example, the regular pattern includes a pattern of color filter features that may include, for example, a plurality of different colored features. The features for each color may be imaged separately. In connection with such an example, a color filter substrate may be provided. A black matrix may be formed on the substrate. A colored dye donor element may be provided for each pattern color. The black matrix formed on the substrate may be overlaid with each colored dye donor element, the pattern color features corresponding to the donor color may be imaged, and the imaged colored dye donor element may be removed. The features for each color may be imaged, for example, in a plurality of scans of the imaging head, each successive scan being adjacent to the previous scan. In one example, the black matrix may be at least imaged onto by the first channel imaged and the last channel imaged within each of the plurality of scans. In another example, the multiple channels may be spaced apart by a regular fixed distance, and the first channel imaged in the successive scan may be displaced from the last channel imaged in the previous scan by more than the fixed distance. In yet another example, the first channel imaged in the successive scan may overlap at least the last channel not imaged in the previous scan. In still another example, the last channel imaged in the previous scan may overlap at least the last channel not imaged in the successive scan. In yet another example, the first channel imaged in the successive scan may overlap at least the last channel imaged in the previous scan.

In still another example, at least one of the multiple channels may not image (e.g., onto the black matrix), the at least one of the multiple channels being located between the first channel imaged and the last channel imaged within each of the plurality of scans. In yet another example, at least one of the multiple channels may not simultaneously image two adjacently positioned color features, the two adjacently positioned color features being separated by the black matrix.

In still another example, the regular pattern includes features representing one or more polymer semiconductor elements. In yet another example, the regular pattern includes features representing elements of a lab-on-a-chip device.

In still another example, a color filter may be produced by a dye transfer process comprising the methods of the embodiments described herein. In yet another example, a multiple channel imaging head for imaging a regular pattern of features may be configured according to the methods of the embodiments described herein. The multiple channel imaging head may include, for example, a light valve having a plurality of controllable elements, each element capable of affecting an incident beam of light to produce a modulated beam of light. The imaging head may include a light source for illuminating the controllable elements. The imaging head may include a lens for directing the modulated beam onto an imaging medium. The light source may be adapted, for example, to illuminate all elements simultaneously. The light valve may include, for example, a plurality of deformable mirror elements.

For an understanding of the present invention, reference will now be made by way of example to the following detailed description in conjunction with the accompanying drawings.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which:

FIG. 1-A is a plan view of a portion of a prior art color filter configuration;

FIG. 1-B is a plan view of a portion of another prior art color filter configuration;

FIG. 4-A is a schematic view of a light valve shown in relation to a substrate, depicting an imaging method in accordance with the present invention;

FIG. 4-B is a schematic view of a light valve shown in relation to a substrate, depicting an alternative embodiment of the imaging method of the present invention; and FIG. 4-C is a schematic view of a light valve shown in relation to a substrate, depicting yet another alternative embodiment of the imaging method of the present invention.

DETAILED DESCRIPTION OF THE INVENTION

Figure 2:
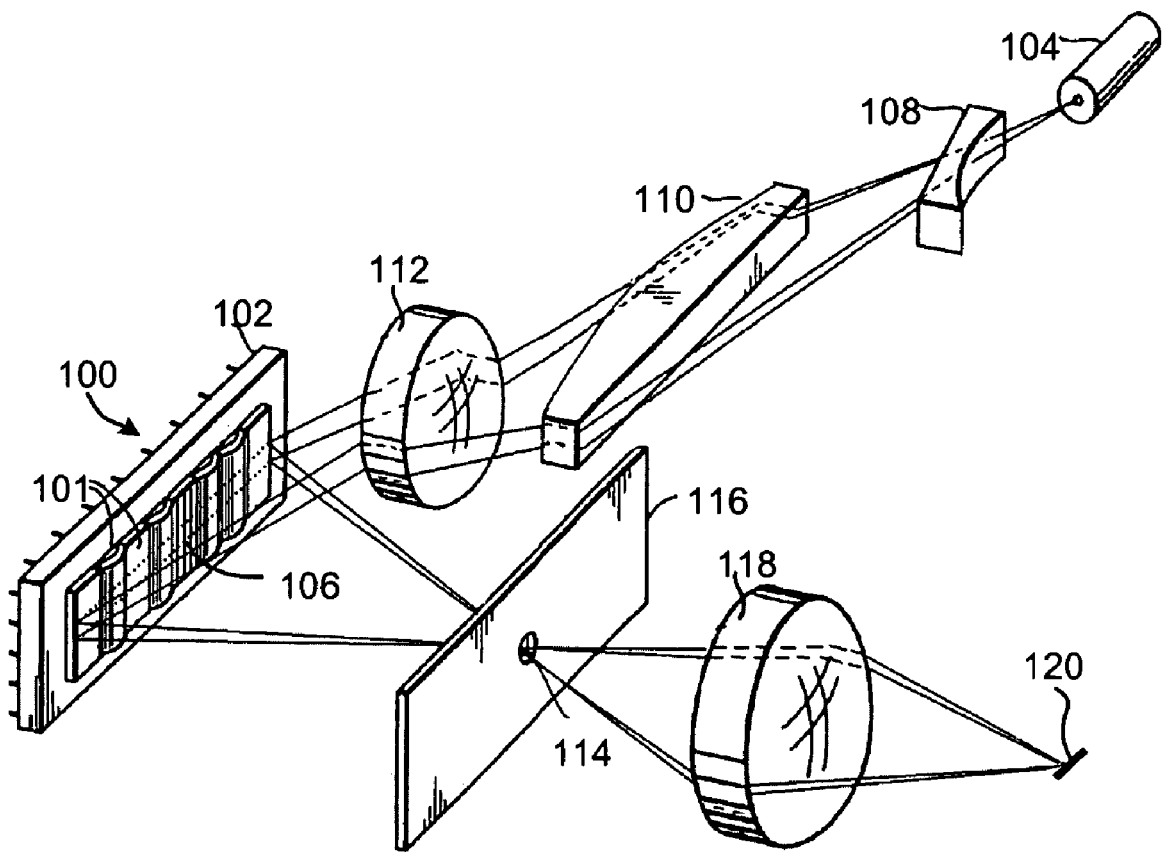
FIG. 2 is a perspective view of an optical system of a prior art imaging head.

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

Several configurations of color elements are used in color filters for LCD display panels. Each color element is typically an elongated rectangle with a short side in the range of 70 µm to 100 µm and a long side in the range of 200 µm to 350 µm. Stripe configurations, shown in FIG. 1-A, have alternating columns of red, green and blue and are the most common that are delineated by a black matrix to form the corresponding color elements. Mosaic configurations shown in FIG. 1-B have the color elements alternating in both directions and provide improved color mix. A delta configuration (not shown) has red, green and blue filter elements in a triangular relationship to each other provides the best color mix. The mosaic and delta configuration color filters are more difficult to fabricate, the mosaic configuration additionally requiring a more complex driving circuit.

FIG. 1-A shows a portion of a stripe configuration color filter 10. Color filter 10 comprises a plurality of red, green and blue color elements 12, 14 and 16 formed in alternating columns across a substrate 18. Color elements 12-16 are outlined by a black matrix layer 20, which divides the elements and prevents the backlight leaking between elements. The columns are commonly imaged in elongate stripes and then subdivided by the black matrix 20 into individual color elements 12-16. The TFT transistor on the associated LCD panel (not shown) is masked by a portion of the black matrix at area 22. FIG. 1-B shows a color filter 24 in the mosaic configuration, the only difference from stripe configuration filter 10 shown in FIG. 1-A being the layout of the color elements, 12-16, which alternate in color down the columns as well as across the rows.

Typically, during the manufacture of color filter 10 of FIG. 1-A, each of the color elements 12-16 can either partially or completely overlap the respective portions of the black matrix 20 that outline each respective color element. Overlapping the black matrix significantly reduces the registration issues that would be encountered if one were to try to apply color to each color element exactly within the boundaries of the portions of the black matrix 20 that delineated that respective color element. Further, in the case where a dye transfer process is used to produce the various color elements, edge discontinuities and various artifacts such as pinholes may occur when each successive dye donor (also known as a color transcription film) is removed post imaging of that respective color element. These artifacts typically occur because the dye material that has been transferred at the edges may not have sufficient adhesive peel strength to remain attached to the dye-receiving element when the dye donor is peeled off. Thus, overlapping the black matrix 20 additionally allows for the hiding of any such edge discontinuities and helps to ensure that the desired contrast between the respective color elements is achieved, since clear areas and voids within the color elements themselves would be minimized.

An example of a complete overlap of a portion of the black matrix 20 is demonstrated in FIG. 1-A. In this example, color element 12 is created by a red stripe that may completely overlap the horizontal portions 25 of the black matrix 20 which delineate each red color element 12 in each red stripe. Needless to say, each color element 12 may only partially overlap the vertical portions 27 of the black matrix 20 so as not to superimpose on the color elements of the adjacent stripes. This requirement for a partial overlap of the black matrix is further demonstrated in the mosaic configuration illustrated in FIG. 1-B. In this example, any given color element would be surrounded on its four sides by adjacent color elements that are composed of colors that are different from the respective color element. In this example, color element 12 could only partially overlap the horizontal portions 25 and vertical portions 27 of the black matrix 20 so as not to adversely superimpose on the adjacent color elements.

In an embodiment of the present invention, a color filter is fabricated by a dye transfer process. This process involves employing a laser head comprising a plurality of laser beams to directly image a dye donor element placed in close contact with a color filter receiver substrate. The color filter receiver substrate typically has a black matrix formed on it. It should be noted that although the black matrix can itself be produced by a dye transfer process, it is typically formed by lithographic techniques which can provide the required accuracy as well as avoid any edge artifacts and discontinuities within the black matrix itself. The dye or colorant is image wise typically transferred to the substrate using a multi-channel light valve based laser head. The red, green and blue portions of the filter are imaged in separate steps, each time replacing the dye donor element with the next color dye to be transferred. Needless to say, each of the red, green and blue portions of the filter must be transferred to the receiver substrate such that each of the portions is in register with the black matrix. After all of the color donors have been separately imaged, the color filter elements are annealed or hardened in a hardening furnace under temperatures of about 200 to 300 deg C. Next, an overcoat layer and a common electrode are subsequently formed on the imaged color filter substrate. The overcoat layer protects the color filter patterns and flattens the surface of the separately imaged color filter patterns. The common electrode is typically made of a transparent conductive material, such as indium-tin-oxide and indium-zinc-oxide.

A prior art light valve based laser head is shown in FIG. 2. A linear light valve array 100 comprising a plurality of deformable mirror elements 101 is fabricated on a silicon substrate 102. A laser 104 generates an illumination line 106 using an anamorphic beam expander comprising cylindrical lenses 108 and 110. U.S. Pat. No. 5,517,359 to Gelbart, for example, describes a method for forming illumination line 106. A lens 112 focuses the laser illumination through an aperture 114 in an aperture stop 116 only when elements 101 are in their unactuated state. The illumination line 106 is laterally spread across the plurality of elements 101 so that each of the elements 101 is illuminated by a portion of illumination line 106.

When any particular element 101 is not actuated, aperture 114 transmits light from that element. Light from actuated elements is blocked by aperture stop 116. A lens 118 images light valve 100 to form an imaging swath 120. Imaging swath 120 comprises a plurality of individual laser beams which are modulated to form corresponding laser pixels that are scanned over the area of the substrate to form an image.

When imaging rigid substrates, as is common in fabricating display panels, the scanner used is usually a flatbed scanner that secures a substrate in a flat orientation. The substrate or the imaging beams, or a combination of both are displaced relative to each other to effect the scan. U.S. Patent Publication No. US 2004/0004122 A1 to Gelbart discloses an example of a high-speed flatbed scanner suitable for display panel imaging. Alternatively, flexible substrates may be secured to either the external or the internal surface of a drum scanner to effect the scan. Even a substrate that is traditionally thought of as rigid, such as glass, may be scanned on a drum scanner provided that the substrate is sufficiently thin and the diameter of the drum is sufficiently large.

Figure 3:
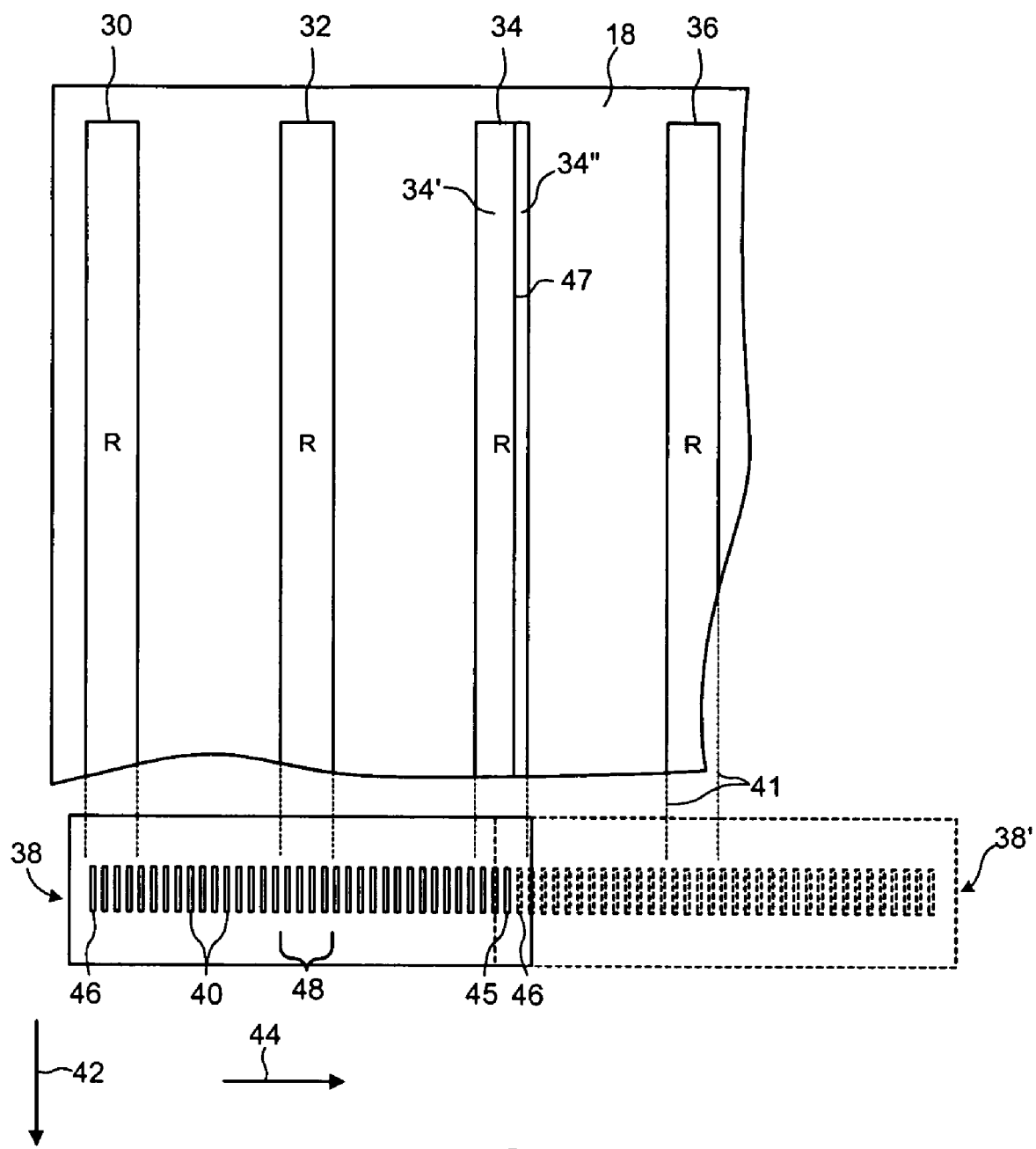
FIG. 3 is a schematic view of a light valve shown in relation to an imaging substrate and depicting a prior art imaging method.

A prior art method of direct imaging is schematically depicted in FIG. 3. A portion of a color-filter substrate 18 has been patterned with a plurality of red stripes 30-36 in a dye transfer process. The width of each of the red stripes need not only be as wide as the visible width of the color elements but can also be of sufficient width to partially overlap the black matrix vertical segments (not shown) that delineate each red element within each respective stripe. A light valve 38 (in a multi-channel imaging head) in a first position, has a plurality of individually addressable channels 40. FIG. 3 depicts the correspondence between the light valve channels 40 and the transferred pattern as broken lines 41. It should be understood that while light valve 38 is shown in FIG. 3 at the same scale as the imaged pattern, the schematic illustration is only intended to show the correspondence between the light valve channels 40 and the patterns 30-36 being written and not necessarily a physical relationship. In practice, as shown in FIG. 2, the light valve may be imaged onto the substrate by a lens 118, which may reformat the size and shape of the imaging swath at the plane of the substrate. Each modulated laser beam produces laser pixels that make up the imaged swath of a desired size. Each laser pixel may have a length in a direction perpendicular to a scan direction the range of 5 μm (i.e., a 4800 dpi resolution) to 20 μm (i.e., a 1200 dpi resolution). The modulation time of each beam determines the width of each laser pixel in a direction parallel to the scan direction. This distance is typically in the range of 3 μm to 20 μm.

The beams generated by light valve 38 are scanned over the substrate in a main scan direction 42 while being imagewise modulated according to the pattern to be written. Groups of channels 48 are activated to produce one or more imaging beams wherever it is desired to form a stripe feature, while other channels not corresponding to the pattern will be off. Since the substrate is usually too large to be imaged in a single scan, multiple scans of the substrate will likely be required to complete the imaging. In this case, each scan is followed by a translation of the light valve 38 in direction 44 so that a subsequent scan will generally be lined up alongside the previous scan. In the depicted embodiment there is no movement in scan direction 44 during each scan in the main scan direction 42, the movement occurring after the scan is completed. Alternatively, for a drum type scanner it is possible to simultaneously scan in both scan directions, thus writing the image in a helix. There are also a few options for aligning previous scans to subsequent scans. Each swath consists of an image area comprising a beginning end line corresponding to the first active channel in the laser head and a terminating end line corresponding to the last active channel in the laser head. It is known in imaging to overlap the terminating end line of the previous scan with the beginning end line of the subsequent scans by one or more channel widths to combat swath edge effects. Alternatively, the first imaged channel of the subsequent scan can be spaced from the last imaged channel of the previous scan by a distance corresponding to the spacing between adjacent channels on the light valve.

Red stripes 30, 32 and the portion 34' of stripe 34 are written while the beams are scanned in a first main scan. On completion of the first main scan the light valve 38 is displaced in the sub-scan direction 44 to a new position 38', shown in broken lines. The sub-scan displacement corresponds to the number of channels available on the light valve 38 (in this case 35 channels). The displaced light valve at 38' positions the first channel 46 adjacent to the previous position of the last channel 45 on light valve at position 38, thus imaging a portion 34" of stripe 34. As previously discussed, it is very difficult to avoid the appearance of a visible discontinuity shown as line 47 at the boundary between portions 34' and 34" of stripe 34. This visible discontinuity, when present within a color element created by the delineation of stripe 34 by the black matrix (not shown), can lead to objectionable visual artifacts.

In accordance with the present invention, the discontinuity 47 is avoided by arranging the imaging so that in successive scans, the swath boundary never falls within the imaged area of a stripe that is eventually visible within each of the color elements delineated by the black matrix. Specifically, the boundary between two adjacent scans can fall within non-imaged areas (areas in which stripes of the particular color of note are not imaged). In this embodiment of the present invention, a substantial gap would result between the between the last activated channel of the first scan and the first activated channel of the second scan. This gap would transcend the non-imaged area. Alternatively, the swath boundary can fall within a portion of the black matrix 20 that delineates a specific color element. In this embodiment of the invention, both the last activated channel (terminating end line) of the first scan and the first activated channel (beginning end line) of the second scan would lie within a portion of the black matrix that delineated (along direction 42) that specific color element. In this embodiment of the invention, a gap or overlap could exist between at least the respective last and first activated channels of the adjacent scans, so long as the resulting gap or overlap remained within the confines of the delineating portion of the black matrix.

The embodiments of the present invention are possible because the pattern is known beforehand and has regular and unchanging features. This concept is further described in relation to FIG. 4-A. Stripes 30 and 32 are imaged in a first scan in main scan direction 42. While it would be possible to image a portion of strip 34 in the first scan, this is specifically avoided. In the second main scan, the light valve position 38 is indexed to a new position 38" so that the first channel 46 is positioned to image right at the start of stripe 34. (The light valve in new position 38" is shown displaced in direction 42 only to avoid obscuring details in the drawing figure.) Channels in the group 50 are disabled so that even though a portion of stripe 34 could be imaged during the first main scan, this is specifically avoided to prevent a swath boundary appearing in an area within the stripe that will be visible in the resulting color element. Consequently, the terminating end line of the imaged scan created by the light valve in position 38 is adjusted to correspond to the last active channel. In the second main scan or swath, the light valve in the displaced position 38" images the start of strip 34 with first channel 46 (the beginning end line of the imaged scan). There is a small penalty in speed due to the fact that light valve 38 is each time displaced in the sub-scan direction 44 by less than a full swath (due to channels 50 being disabled). In the simplified case shown in FIG. 4-A the speed penalty is represented by the 3 channels bracketed at 52 out of the 35 total channels on the light valve, or 8.5%. In practice the light valve may have a few hundred channels and the speed penalty may be less. It should also be apparent that the light valve in position 38 need not position channel 46 to image the start of stripe 30, since channels 50 are all inactive in this specific configuration. Imaging may start at any one of a number of select channels without impacting productivity. Further, imaging of any of the successive scans may start at a different channel from the channel in which imaging was initiated on the first scan. These situations are specific to a particular situation though, and if the light valve is specifically fabricated with an optimal number of channels such flexibility may not be possible.

FIG. 4-B shows the imaging method for a mosaic configuration color filter in accordance with the present invention. The present invention is equally applicable in this case except that instead of imaging stripes as shown in FIG. 4-A, a plurality of color elements 60 are separately imaged onto substrate 18. Channels 66 are disabled this time and when imaging color element 62 and 64, the light valve is again indexed to position 38" so that the entire element is imaged in a single scan and no discontinuity appears. Since stripes are not imaged in this embodiment of the invention, uninterrupted non-imaged areas are not present. Swath boundaries, and consequently the beginning and terminating end lines of each scan, must therefore occur on the vertical portions of the black matrix (not shown) that would delineate each of the color elements. Therefore, a swath boundary would occur on the vertical portion of the black matrix that delineates color elements 62 and 64 from adjacent color element 63. In this embodiment of the invention, both the last activated channel (terminating end line) of the first scan and the first activated channel (beginning end line) of the second scan would lie on the vertical portion of the black matrix that delineated (along direction 42) that specific color element. In this embodiment of the invention, a gap or overlap could exist between at least the respective last and first activated channels of the adjacent scans, so long as the resulting gap or overlap remained within the confines of the delineating portion of the black matrix. In other words, the gap or overlap is smaller in width than the delineated portion of the black matrix.

Similarly, a delta configuration color filter may also be imaged using the method of the present invention, since the requirement of a pattern of regularly spaced features is also present in this configuration.

FIG. 4-C shows another embodiment of the present invention in which a stripe configuration is imaged. In this embodiment of the invention, however, each scan is imaged in direction 44 and subsequent scans are indexed in direction 42. Stripe features 30, 32 and 34 are portrayed in an interrupted fashion to illustrate the intersections of the black matrix (not shown) represented by positions 70. As previously stated, the portions of the black matrix represented by positions 70 need only be imaged onto in part to minimize registration and contrast issues of each color element adjacent to the respective portion of the black matrix. Therefore, the light valve can either partially or fully image onto any portion of the black matrix that falls within a given swath boundary. In this embodiment of the invention, channels 68 are disabled since they are of an insufficient number to completely image color elements 74 within the stripes. The light valve is therefore indexed to position 38" so that the color elements 74 are completely imaged in a single scan and no discontinuity appears. This embodiment of the invention is similar to the embodiment shown in FIG. 4-B, in which only portions of the black matrix interrupt the stripe features 30, 32 and 34. In other words, no uninterrupted imaging gaps are created along the main scan direction by the need to image an element of a different color. All swath boundaries therefore occur on a portion of the black matrix. The last active channel of a first scan (i.e., the terminating end line of the first scan) is imaged onto a portion of the black matrix. The first active channel of the subsequent and adjacent scan (i.e., the beginning end line) is imaged onto a portion of the black matrix. Both portions of the black matrix can be one and the same as in the case where a swath boundary is required over a single portion of the black matrix. Alternatively, both portions of the black matrix may be distinct from one another as is exemplified by two portions of a black matrix separated by at least one non-imaged area in which another color is to be imaged.

As previously described, subsequent scans may overlap or closely abut the previous scan. Clearly there are even more options available when imaging regular patterns. Referring back to FIG. 4-A, when the last channels 52 of light valve 38 fall within feature 34 as shown, channels 50 may be disabled and the subsequent scan aligned to the start of feature 34. Alternatively, should the last channel of light valve fall between features 32 and 34, the subsequent scan may still be aligned with the start of feature 34, leaving a substantive gap between successive scans or swaths. Thus, depending on the particular repeat of the regular features, subsequent scans may or may not overlap.

Gaps may not only occur between successive swaths. Inter-swath gaps may also occur within any one given swath. An inter-swath gap 51 corresponds to the non-imaged area dictated by the stripe configuration shown in FIG. 4-A. Further, inter-swath gaps need not be confined to the specific areas in which subsequent stripes or color elements corresponding to the other color filter colors are imaged. Inter-swath gaps can also occur within the both the horizontal and vertical portions of the black matrix that delineate the color elements imaged by any given swath. An inter-swath gap that occurs within the boundaries of a portion of the black matrix can be incorporated when a full imaging overlap onto the respective portion of the black matrix is not desired. FIG. 4-C shows an embodiment of the invention in which channels 72 of the light valve position 38 are not activated. The position of channels 72 corresponds to an image area within a portion 70 of the black matrix. Therefore, the channels adjacent to channels 72 would image onto the remainder of portion 70 of the black matrix resulting in an inter-swath gap within the portion 70. It follows that each portion of the black matrix is smaller than the width of the respective black matrix element. Thus, whether an inter-swath gap or swath-to-swath gap occurs over a portion of the black matrix, the light valve must have channels capable of providing imaging beams with sufficient resolution or granularity to partially overlap onto the portion of the black matrix without adversely affecting a neighboring color element.

The configuration of the multi-channel imaging head may be performed in a number of ways. Essentially, a regular pattern of features is analyzed, and a repeat distance between the features is determined. In the specific case of a color filter, where it is desired that the features overlap onto the black matrix to reduce registration problems, the repeat distance will begin and end on the black matrix. The channels of the imaging head are configured to image complete features according to multiples of the determined repeat distance. Consequently, this repeat distance is equal to a distance or dimension between the beginning end line and terminating end line of each scan. This dimension between the end lines corresponds to a product of length of the laser pixels times the number of laser pixels produced by the modulated beams activated in the laser head to produce the necessary repeat distance. In an example in which some of the laser pixels are active and other laser pixels are inactive, the dimension between the end lines is determined by a product of a length of each laser pixel times the number of active laser pixels. The inactive laser pixels may all be disposed in a predetermined portion of the laser head. For example, the inactive laser pixels may be disposed toward one end of the laser head (e.g., channels 50 of FIG. 4-A, channels 66 of FIG. 4-B, and channels 68 of FIG. 4-C).

The dimension between the end lines defined by each of the repeated scans may be between $N \times B+(N-1) \times C$ and $N \times (B+C)$, where N is an integer, C is a width of the black matrix in the direction perpendicular to the scan direction, and B is a length of a color filter pattern region defined inside the black matrix in the direction perpendicular to the scan direction. Alternatively, the dimension between the end lines defined by each one of the repeated scans may be between $N \times B+(N-1) \times C$ and $N \times B+(N-0.5) \times C$, where N is an integer, C is a width of the black matrix in the direction perpendicular to the scan direction, and B is a length of a color filter pattern region defined inside the black matrix in the direction perpendicular to the scan direction.

If an imaging or laser head is required to image an unchanging pattern, the head may be manufactured or hardware configured for a specific number of channels. Advantageously, if the pattern is likely to change from time to time, the configuration means may be provided in the form of a hardware or software switch. It is well known to use dual inline package (DIP) switches for configuration of electronic hardware. With the inclusion of microprocessor hardware into many imaging products, the configuration may equally well be performed via a software interface to the hardware. Control via a software parameter allows automated on-the-fly configuration of the imaging head, which may be desirable should there be relatively frequent changes in the pattern.

Alternatively, the configuration may involve reformatting imaging data representing the pattern to be imaged such that channels that are to be disabled do not receive image data that would cause them to image. However, it should be noted that it is also necessary to adjust the amount by which the imaging beams are traversed after each scan to ensure that all features are correctly written.

Example

An 11×13 inch three color image was prepared for a 1200 dpi imaging head with 224 available channels. The target width of each imaged color element stripe was 84.6 µm corresponding to 4 channels on the imaging head. The spacing between adjacent stripes of different color was one channel, or 21.167 µm. The imaging head used was a SQUAREspot® thermal imaging head manufactured by Creo Inc. of Burnaby, British Columbia, Canada. The head was mounted on the flatbed scanner as described in the paper "Thermal Transfer for Flat Panel Display Manufacturing", Eran Elizur and Dan Gelbart, Journal of the Society for Information Display, Vol. 11 Number 1, pp. 199-202.

The imaging head interface allows configuration of the number of imaging channels, but only in groups of 8. The chosen pattern repeat of 4 channels on and 1 channel off further constrains the number of channels to being a multiple of 40 (5×8=40 channels). The largest number of channels that may be used on this particular imaging head imaging head is 200. The imaging head was thus configured to enable 200 channels, the remaining 24 channels being disabled.

A single Tiff format image file was prepared with the pattern for a single color separation (i.e., 84.6 µm stripes 317.5 µm apart). The file was imaged separately for each of a blue, red and green donor in sequence. For the red donor, the image start position was shifted by 105.8 µm. For the green donor, the image start position was shifted by a further 105.8 µm to create the completed pattern of alternating color stripes (see, for example, FIG. 1-A). As configured, no swath boundaries appear in the color-element areas. Each successive color donor was removed post imaging and was replaced with the next color donor to be imaged.

The resulting sample was subjectively characterized for banding and found to show less visible banding than samples prepared with the full 224 channels available on the imaging head.

It will be readily apparent to a person of skill in the art that in the preceding example the choice of pattern and imaging head was made under the constraints of the available imaging head configuration. The 24 disabled channels have the effect of reducing productivity by approximately 11%. For any given pattern size and repeat the imaging head may be specifically manufactured and configured to avoid the loss of throughput. For instance, with an exposure head of 240 channels, the imaging of the pattern detailed in the example may proceed at full productivity.

While the present invention has been described in relation to display and electronic device fabrication, the methods described herein are directly applicable to the imaging of any regular pattern. For example, the methods of the present invention are applicable in the field of biomedical imaging for Lab-on-a-chip (LOC) fabrication. LOC technology is a rapidly growing research topic within the Instrumentation and Healthcare industries. The principle is to produce an automated, microscale laboratory to enable sample preparation, fluid handling, analysis and detection steps to be carried out within the confines of a single microchip. LOC chips may have several repeating pattern features.

In addition, while a particular embodiment of a multi-channel imaging head has been described in relation to FIG. 2, the imaging head of FIG. 2 is merely illustrative. There are many other suitable types of multi-channel imaging heads for use in accordance with the methods of the present invention.

As will be apparent to those skilled in the art in light of the foregoing disclosure, many alterations and modifications are possible in the practice of this invention without departing from the spirit or scope thereof.

What is claimed is:

1. A method of configuring a multiple channel imaging head for imaging a regular pattern of features, the method comprising:
    determining a number of channels for imaging such that only one or more complete pattern features will be imaged in a single scan of the imaging head; and
    configuring the imaging head in accordance with the determined number of channels, wherein at least one of the multiple channels is not imaged, the at least one of the multiple channels being located between the first channel imaged and the last channel imaged in the single scan.

2. A method according to claim 1, wherein configuring the imaging head comprises disabling one or more of the multiple channels.

3. A method according to claim 2, wherein the imaging head has sufficient channels for imaging an integer number of complete pattern features and one partial pattern feature in a single scan of the imaging head, and wherein configuring the imaging head comprises disabling at least the channels that image the one partial pattern feature so that only the integer number of complete pattern features are imaged in a single scan of the imaging head.

4. A method according to claim 2, wherein the regular pattern is imaged in a plurality of scans of the imaging head and further including disabling the same channels during each of the scans of the multiple channel imaging head.

5. A method according to claim 1, wherein the regular pattern is imaged in a plurality of scans of the imaging head, each successive scan being adjacent to a previous scan.

6. A method according to claim 5, wherein the multiple channels are spaced apart by a regular fixed distance and the first channel imaged in the successive scan is displaced from the last channel imaged in the previous scan by more than the fixed distance.

7. A method according to claim 5, wherein the first channel imaged in the successive scan overlaps at least the last channel not imaged in the previous scan.

8. A method according to claim 5, wherein the last channel imaged in the previous scan overlaps at least the first channel not imaged in the subsequent scan.

9. A method according to claim 1, wherein configuring the imaging head comprises altering at least one parameter stored in a memory element.

10. A method according to claim 9, wherein the parameter corresponds to the determined number of channels.

11. A method according to claim 1, wherein configuring the imaging head comprises reformatting image data representing the pattern of features.

12. A method according to claim 1, wherein the imaging head is used to image at least two different regular patterns, and wherein the configuring is performed for each different regular pattern.

13. A method according to claim 1, wherein the regular pattern comprises a pattern of color filter features.

14. A method according to claim 13, wherein the color filter features comprise a plurality of different colored elongated stripes, and wherein the elongated stripes for each color are imaged separately.

15. A method according to claim 13, wherein the pattern of color filter features comprises a plurality of different colored features, and wherein the features for each color are imaged separately.

16. A method according to claim 15, further comprising:
providing a color filter substrate;
forming a black matrix on the substrate;
providing a colored donor element for each pattern color; and
in turn, overlaying the black matrix formed on the substrate with each colored dye donor element, imaging the pattern color features corresponding to the donor color, and removing the imaged colored dye donor element.

17. A method according to claim 16, wherein the features for each color are imaged in a plurality of scans of the imaging head, each successive scan being adjacent to a previous scan.

18. A method according to claim 17, wherein the black matrix is at least imaged onto by the first channel imaged and the last channel imaged within each of the plurality of scans.

19. A method according to claim 18, wherein the first channel imaged in the successive scan overlaps at least the last channel imaged in the previous scan.

20. A method according to claim 17, wherein the multiple channels are spaced apart by a regular fixed distance, and wherein the first channel imaged in the successive scan is displaced from the last channel imaged in the previous scan by more than the fixed distance.

21. A method according to claim 17, wherein the first channel imaged in the successive scan overlaps at least the last channel not imaged in the previous scan.

22. A method according to claim 17, wherein the last channel imaged in the previous scan overlaps at least the last channel not imaged in the subsequent scan.

23. A method according claim 16, wherein one or more of the multiple channels cannot simultaneously image two adjacently positioned color features, the two adjacently positioned color features being separated by the black matrix.

24. A method according to claim 1, wherein the at least one of the multiple channels does not image onto the black matrix.

25. A method according to claim 1, wherein the pattern comprises features representing one or more polymer semiconductor elements.

26. A method according to claim 1, wherein the pattern comprises features representing elements of a lab-on-a-chip device.

27. A color filter produced by a dye transfer process, the dye transfer process comprising the method of claim 1.

28. A multiple channel imaging head for imaging a regular pattern of features configured according to the method of claim 1.

29. A multiple channel imaging head according to claim 28, comprising:
a light valve having a plurality of controllable elements, each element capable of affecting an incident beam of light to produce a modulated beam of light;
a light source for illuminating the controllable elements; and
a lens for directing the modulated beam onto an imaging medium.

30. A multiple channel imaging head according to claim 29, wherein the light source is adapted to illuminate all elements simultaneously.

31. A multiple channel imaging head according to claim 29, wherein the light valve comprises a plurality of deformable mirror elements.

32. A method of configuring a multiple channel imaging head for imaging a regular pattern of features, wherein the imaging head includes sufficient channels for forming one or more complete pattern features and a partial pattern feature during a scan of the imaging head, the method comprising:
determining a repeat distance between the features in the pattern;
determining a number of channels for imaging such that only the one or more complete pattern features can be imaged in each scan of the imaging head;
configuring the imaging head in accordance with the determined number of channels;
forming the one or more complete pattern features in each scan, wherein a beginning line of each scan is separated from a beginning line of an adjacent scan by a distance equal to the determined repeat distance.

* * * * *